United States Patent
Morimoto (10) Patent No.: US 8,829,796 B2
(45) Date of Patent: Sep. 9, 2014

(54) LIGHTING CONTROL SYSTEM

(71) Applicant: Toshiba Lighting & Technology Corporation, Yokosuka (JP)

(72) Inventor: Yasushi Morimoto, Yokosuka (JP)

(73) Assignee: Toshiba Lighting & Technology Corporation, Yokosuka-shi, Kanagawa-ken (JP)

(*) Notice: Subject to any disclaimer, the term of this patent is extended or adjusted under 35 U.S.C. 154(b) by 0 days.

(21) Appl. No.: 13/783,436

(22) Filed: Mar. 4, 2013

(65) Prior Publication Data

US 2013/0234604 A1   Sep. 12, 2013

(30) Foreign Application Priority Data

Mar. 9, 2012 (JP) ................ 2012-053561

(51) Int. Cl.
   *H05B 37/02* (2006.01)
(52) U.S. Cl.
   CPC ............................... *H05B 37/02* (2013.01)
   USPC ........................................ 315/153; 315/312
(58) Field of Classification Search
   CPC .............. B60Q 3/02; B60Q 3/00; B60Q 1/14; H05B 37/02
   USPC ......... 315/193, 291, 307, 308, 312, 320, 153, 315/154
   See application file for complete search history.

(56) References Cited

U.S. PATENT DOCUMENTS

| | | | |
|---|---|---|---|
| 4,792,731 A | 12/1988 | Pearlman et al. | |
| 2009/0021955 A1* | 1/2009 | Kuang et al. | 362/479 |

FOREIGN PATENT DOCUMENTS

| | | |
|---|---|---|
| JP | 2011-044384 A | 3/2011 |
| WO | 2006/111927 A1 | 10/2006 |
| WO | 2008/033029 A1 | 3/2008 |
| WO | 2009/017353 A2 | 2/2009 |
| WO | 2009/081329 A1 | 7/2009 |

OTHER PUBLICATIONS

Extended EP Search Report mailed Jul. 22, 2013, EP App 13157284.4.

* cited by examiner

*Primary Examiner* — Jimmy Vu
(74) *Attorney, Agent, or Firm* — Banner & Witcoff, Ltd.

(57) ABSTRACT

In a lighting control system according to an embodiment, a storing unit stores a correspondence relation in which at least one of a plurality of type 2 groups is associated with each of type 1 groups. Methods of distribution of K luminaires are different in the type 1 groups and the type 2 groups. The control unit controls a lighting state of the type 1 groups indicated by an input control signal and subjects a lighting state of the type 2 groups associated with the type 1 groups to be controlled in the correspondence relation to associated control.

10 Claims, 10 Drawing Sheets

| L1  | L2  | L5  | L6  | L9  | L10 | L13 | L14 |
|-----|-----|-----|-----|-----|-----|-----|-----|
| L3  | L4  | L7  | L8  | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

FIG.3B

| G1-1  | G1-2  | G1-3  | G1-4  |
|-------|-------|-------|-------|
| G1-5  | G1-6  | G1-7  | G1-8  |
| G1-9  | G1-10 | G1-11 | G1-12 |
| G1-13 | G1-14 | G1-15 | G1-16 |

FIG.4A

| L1 | L2 | L5 | L6 | L9 | L10 | L13 | L14 |
|----|----|----|----|----|-----|-----|-----|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

| COMBINATION NUMBER | TYPE 1 GROUP NUMBER | TYPE 2 GROUP NUMBER |
|---|---|---|
| 1 | G1-1 | G2-4 |
| 2 | G1-2 | G2-3 |
| 3 | G1-3 | G2-8 |
| 4 | G1-4 | G2-7 |
| 5 | G1-5 | G2-1 |
| 6 | G1-6 | G2-1 |
| ⋮ | ⋮ | ⋮ |
| 16 | G1-16 | G2-7 |

FIG.5B

| TYPE 1 GROUP NUMBER | CONSTITUENT MEMBER |
|---|---|
| G1-1 | L1 TO L4 |
| G1-2 | L5 TO L8 |
| G1-3 | L9 TO L12 |
| G1-4 | L13 TO L16 |
| ⋮ | ⋮ |
| G1-16 | L61 TO L64 |

FIG.5C

| TYPE 2 GROUP NUMBER | CONSTITUENT MEMBER |
|---|---|
| G2-1 | L1, L2, L5, L6, L9, L10, L13, L14 |
| G2-2 | L3, L17, L19, L33, L35, L49 |
| G2-3 | L4, L18, L20, L34, L36, L50 |
| G2-4 | L7, L21, L23, L37, L39, L53 |
| G2-5 | L8, L22, L24, L38, L40, L54 |
| ⋮ | ⋮ |
| G2-10 | L51, L52, L55, L56, L59, L60, L63, L64 |

FIG.6

| L1 | L2 | L5 | L6 | L9 | L10 | L13 | L14 |
|----|----|----|----|----|-----|-----|-----|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

FIG.7

| COMBINATION NUMBER | TYPE 1 GROUP NUMBER | TYPE 2 GROUP NUMBER |
|---|---|---|
| 1 | G1-1 | G2-1, G2-2 |
| 2 | G1-2 | G2-1, G2-2 |
| 3 | G1-3 | G2-1, G2-9 |
| 4 | G1-4 | G2-1, G2-9 |
| 5 | G1-5 | G2-1, G2-2 |
| 6 | G1-6 | G2-1, G2-2 |
| ⋮ | ⋮ | ⋮ |
| 16 | G1-16 | G2-9, G2-10 |

FIG.8

| L1 | L2 | L5 | L6 | L9 | L10 | L13 | L14 |
|----|----|----|----|----|-----|-----|-----|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

| COMBINATION NUMBER | TYPE 1 GROUP NUMBER | DIRECTION OF PERSON | TYPE 2 GROUP NUMBER |
|---|---|---|---|
| 1 | G1-1 | EAST | G2-1 |
| 2 | | WEST | G2-2 |
| 3 | | SOUTH | G2-2 |
| 4 | | NORTH | G2-1 |
| 5 | G1-2 | EAST | G2-1 |
| 6 | | WEST | G2-2 |
| 7 | | SOUTH | G2-2 |
| 8 | | NORTH | G2-1 |
| ⋮ | ⋮ | ⋮ | ⋮ |
| 61 | G1-16 | EAST | G2-9 |
| 62 | | WEST | G2-10 |
| 63 | | SOUTH | G2-10 |
| 64 | | NORTH | G2-9 |

FIG.11

| L1 | L2 | L5 | L6 | L9 | L10 | L13 | L14 |
|---|---|---|---|---|---|---|---|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

| L1 | L2 | L5 | L6 | L9 | L10 | L13 | L14 |
|----|----|----|----|----|-----|-----|-----|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

FIG.13B

| L1 | L2 | L5 | L6 | L9 | L10 | L13 | L14 |
|----|----|----|----|----|-----|-----|-----|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

FIG.13C

| L1 | L2 | L5 | L6 | L9 | L10 | L13 | L14 |
|----|----|----|----|----|-----|-----|-----|
| L3 | L4 | L7 | L8 | L11 | L12 | L15 | L16 |
| L17 | L18 | L21 | L22 | L25 | L26 | L29 | L30 |
| L19 | L20 | L23 | L24 | L27 | L28 | L31 | L32 |
| L33 | L34 | L37 | L38 | L41 | L42 | L45 | L46 |
| L35 | L36 | L39 | L40 | L43 | L44 | L47 | L48 |
| L49 | L50 | L53 | L54 | L57 | L58 | L61 | L62 |
| L51 | L52 | L55 | L56 | L59 | L60 | L63 | L64 |

FIG.14

LIGHTING CONTROL SYSTEM

CROSS-REFERENCE TO RELATED APPLICATION

This application is based upon and claims the benefit of priority from Japanese Patent Application No. 2012-053561 filed on Mar. 9, 2012, the entire contents of which are incorporated herein by reference.

FIELD

Embodiments described herein relate generally to a lighting control system.

BACKGROUND

A task ambient system is known in which partial lighting for lighting up only a necessary area such as a work surface and general lighting for lighting up the entire room are combined.

In the case of the partial lighting, whereas the illuminance of the work area can be secured, the illuminance around the work area is low. That is, since the illuminance in a visual field range of an operator is uneven, the eyes of the operator tend to be tired.

Therefore, there is a technique for separately setting an auxiliary luminaire around the operator to improve a sense of brightness felt by the operator.

However, if the auxiliary luminaire is separately set, setting costs and running costs for electric power and the like increase.

DETAILED DESCRIPTION

It is an object of the embodiment to provide a lighting control system that improves a sense of brightness while reducing costs.

In a first embodiment explained below, in a lighting control system 1, a plurality of type 1 groups and a plurality of type 2 groups allocated to respective setting areas are set in a group of luminaries. The lighting control system 1 includes a control unit configured to subject each of the type 1 groups and the type 2 groups to individual control. The control unit is configured to subject, according to the individual control of the type 1 groups, the type 2 groups associated with the type 1 groups to the associated control. The control unit more preferentially performs the associated control for lighting the type 2 groups involved in the individual control of the type 1 groups than the individual control of the type 2 groups.

The individual control means control for directly lighting and extinguishing predetermined groups independently. The associated control means control involved in the individual control. That is, a subordination relation of the type 1 groups and the type 2 groups can be set by the associated control. A lighting state of the type 2 groups can be changed by the associated control involved in the individual control of the type 1 groups or by the individual control of the type 2 groups.

Further, when luminaires that are constituent elements of the type 1 groups and the type 2 groups are controlled, the individual control of the type 1 groups may be more preferentially performed than the associated control of the type 2 groups involved in the individual control of the type 1 groups.

In a second embodiment, the group of luminaires is arranged on the ceiling surface in the room. Each of the type 2 groups is configured by luminaires arranged in a wall side region excluding a center region of the ceiling surface.

Figure 9:
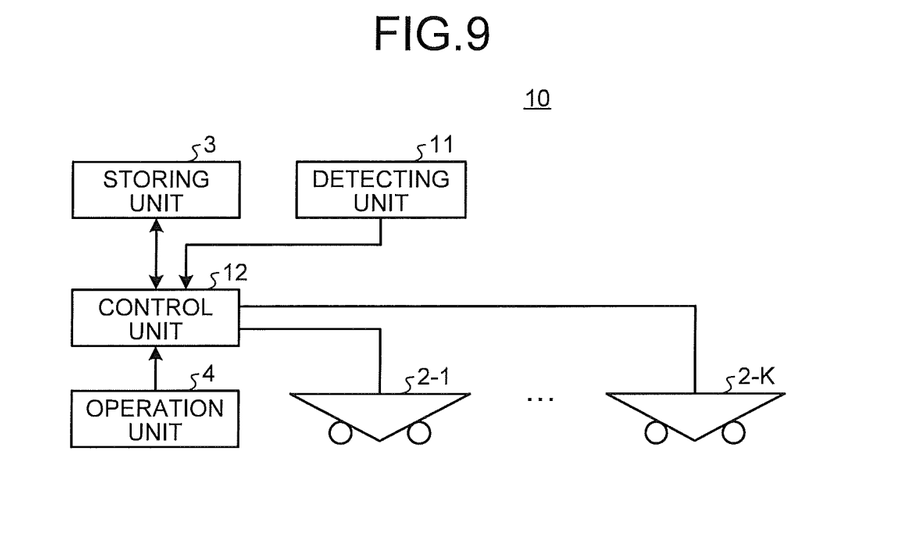
FIG. 9 is a block diagram showing an example of a lighting control system according to a third embodiment.

In a third embodiment, in a lighting control system 10, a detecting unit 11 detects directions of a person in a setting area corresponding to each of the type 1 groups. A plurality of direction candidates and the type 2 groups corresponding to each of the direction candidates are associated with each of the type 1 groups. A control unit 12 subjects the type 2 groups associated with the type 1 groups to the associated control when subjecting the type 1 groups to the individual control.

Figure 12:
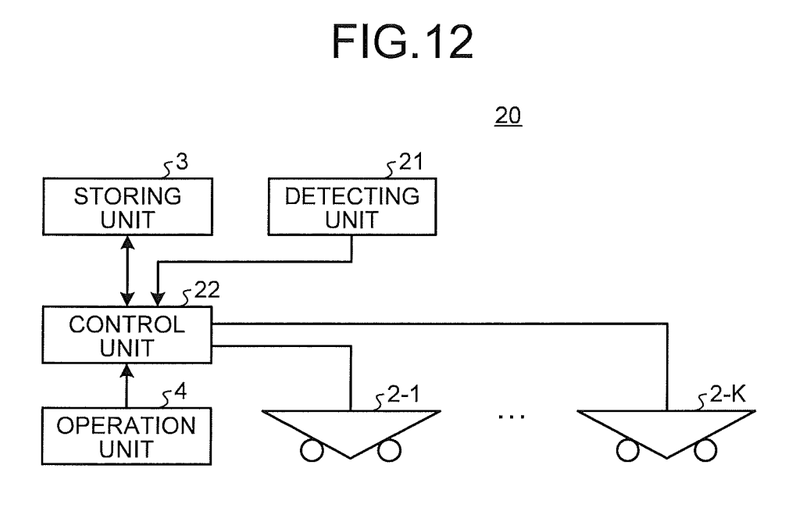
FIG. 12 is a block diagram showing an example of a lighting control system according to a fourth embodiment.

In a fourth embodiment, in a lighting control system 20, a detecting unit 21 detects the brightness of the wall in the room. A control unit 22 performs the associated control of the type 2 groups involved in the individual control of the type 1 groups according to a level of the detected brightness.

In a fifth embodiment, in the lighting control system 1, when a first type 1 group, a second type 1 group, and a type 2 group associated with both of the first type 1 group and the second type 1 group in an association relation are lit, a control unit 5 adjusts a dimming level of the luminaires that are constituent elements of the first type 1 group and are constituent elements of the type 2 group to a dimming level of the first type 1 group.

Further, upon receiving a control signal for instructing extinguishing of the first type 1 group, the control unit 5 extinguishes only luminaires that are the constituent elements of the first type 1 group and are not the constituent elements of the type 2 group. Further, the control unit 5 adjusts a dimming level of luminaires that are the constituent elements of the first type 1 group and are the constituent elements of the type 2 group from the dimming level of the first type 1 group to a dimming level of the type 2 group.

Lighting control systems and lighting control apparatuses according to embodiments are explained below with reference to the drawings. In the embodiments, components having the same functions are denoted by the same reference numerals and signs and redundant explanation of the components is omitted.

First Embodiment

Configuration of a lighting control system

Figure 1:
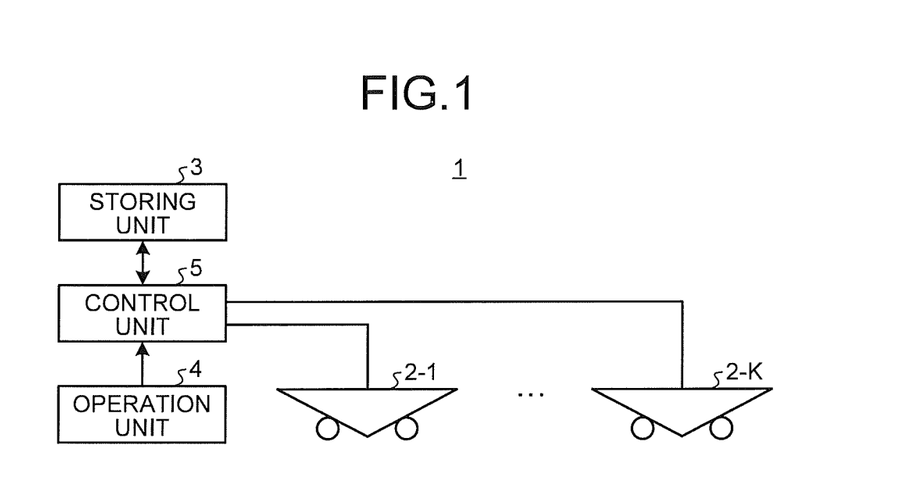
FIG. 1 is a block diagram showing an example of a lighting control system according to a first embodiment.

FIG. 1 is a block diagram showing an example of a lighting control system according to a first embodiment. In FIG. 1, a lighting control system 1 includes K luminaires 2-1 to 2-K, an operation unit 4, and a lighting control apparatus including a storing unit 3 and a control unit 5.

"Lighting and extinguishing states" of the luminaires 2 change on the basis of a control signal received from the control unit 5. The lighting and extinguishing states may include only two states of lighting and extinguishing or may include three states of lighting in a plurality of lighting levels and extinguishing. An "extinguishing state" means a state in which the luminaires 2 are extinguished. A "lighting state" means states other than extinguishing, i.e., all dimming states or all lighting states.

The K luminaires 2-1 to 2-K (hereinafter sometimes referred to as "a group of luminaires") are set on, for example, the ceiling surface in the room. The luminaires 2-1 to 2-K are allocated to a plurality of type 1 groups and a plurality of type 2 groups for the respective setting areas.

The storing unit 3 stores a "correspondence relation" in which at least one of the plurality of type 2 groups is associated with each of the type 1 groups. Specifically, the storing unit 3 stores a correspondence relation table in which the plurality of type 1 groups, at least one type 2 group corresponding to each of the type 1 groups, constituent members (i.e., the luminaires 2) of each of the type 1 groups and the type 2 groups are associated.

The operation unit 4 is, for example, a wall switch set on a wall surface to subject each of the plurality of type 1 groups and the plurality of type 2 groups to lighting control. The operation unit 4 includes, for example, a plurality of switches respectively corresponding to the plurality of type 1 groups and the plurality of type 2 groups. By turning on and off a switch, it is possible to subject a lighting state of the luminaires 2 included in the type 1 groups or the type 2 groups corresponding to the switch to the individual control. The operation unit 4 generates a control signal corresponding to identification information of the operated switch and content information of the operation and outputs the control signal to the control unit 5. According to the control signal, the control unit 5 specifies the type 1 groups to be operated and operation content. For example, a relation between identification information of the operation unit 4 and luminaires corresponding to the identification information is stored in the storing unit 3. The control unit 5 that receives the identification information can specify the type 1 groups and the type 2 groups corresponding to the identification information of the switches by reading out the identification information and the correspondence relation between the type 1 groups and the type 2 groups from the storing unit 3. Only the identification information may be transmitted from the operation unit 4 and the control unit 3 may specify control content of luminaires.

The control unit 5 subjects, on the basis of the control signal received from the operation unit 4, a lighting state of the type 1 groups to the individual control and subjects a lighting state of the type 2 groups associated with the type groups subjected to the individual control in the correspondence relation stored in the storing unit 3 to the associated control. In the individual control of the type 1 groups or the type 2 groups, a lighting state is precedent to an extinguishing state. That is, luminaires for which the type 1 groups and the type 2 groups are redundantly set are lit as long as the type 1 groups or the type 2 groups are subjected to the individual control to be lit and are extinguished when the individual control is performed to extinguish both of the type 1 groups and the type 2 groups. The associated control means controlling a lighting state of the type 2 groups associated with the type 1 groups involved in the individual control of the type 1 groups. In this embodiment, a relation of master and servant is formed between the type 1 groups and the type 2 groups. The associated control of the type 1 groups involved in the individual control of the type 2 groups is not performed.

Specifically, the control unit 5 transmits a control signal to all the luminaires 2 belonging to a type 1 group subjected to the individual control and a type 2 group associated with the type 1 group. The control signal indicates a lighting state after the control.

Upon receiving the control signal, the luminaires 2 shift to the lighting state indicated by the control signal.

Operation of the Lighting Control System

Figure 2:
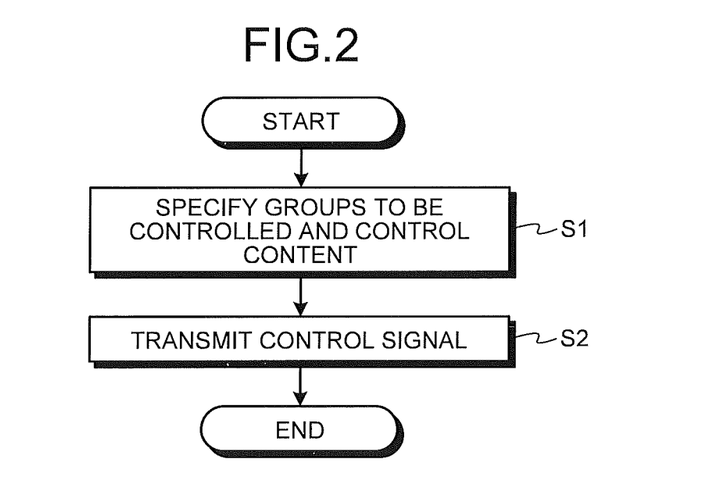
FIG. 2 is a flowchart for explaining an example of a processing operation of a control unit in the first embodiment.

The operation of the lighting control system 1 including the configuration explained above is explained. FIG. 2 is a flowchart for explaining an example of a processing operation of the control unit 5 in the first embodiment.

First, upon receiving a control signal for subjecting the type 1 groups to the individual control from the operation unit 4, the control unit 5 specifies, on the basis of the control signal and the correspondence relation table, the type 1 groups to be subjected to the individual control and the type 2 groups to be subjected to the associated control and control content (ACT 1). That is, since the control signal directly corresponds to the type 1 group, first, the type 1 groups are specified by the control signal. Then, the type 2 groups associated with the specified type 1 groups in the correspondence relation table are specified.

Figure 3A:
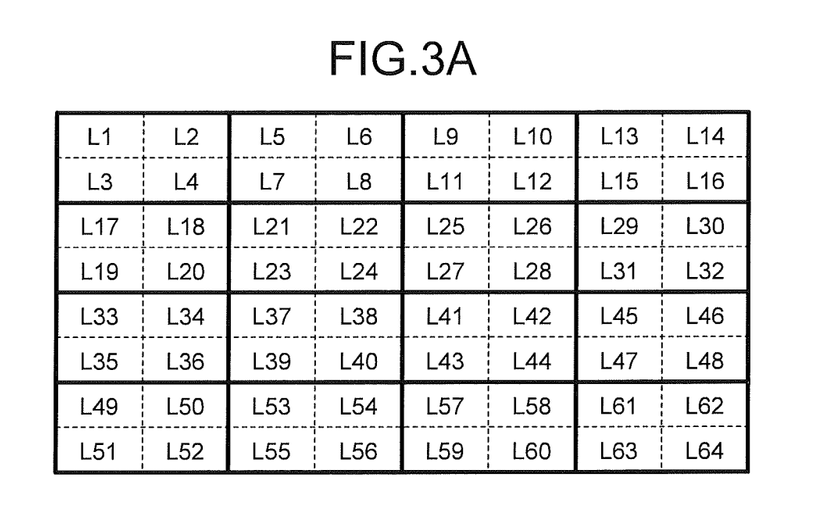
FIG. 3A is a diagram for explaining an example of type 1 groups in the first embodiment.
Figure 3B:
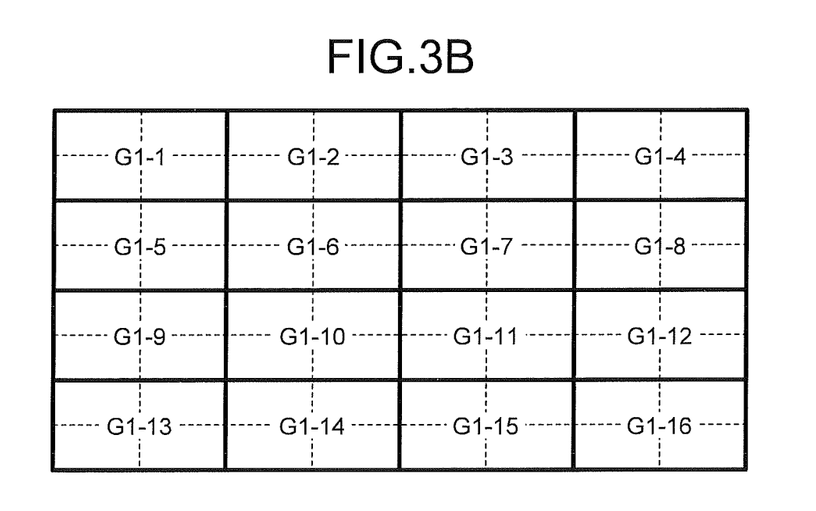
FIG. 3B is a diagram for explaining an example of type 1 groups.
Figure 4A:
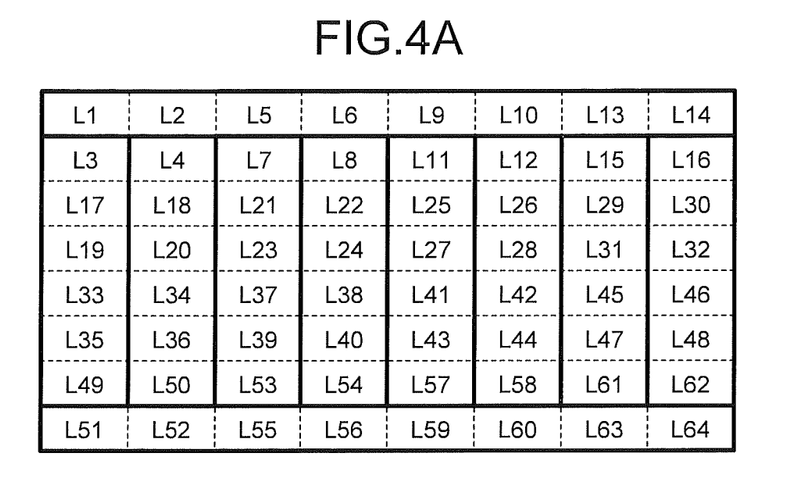
FIG. 4A is a diagram for explaining an example of type 2 groups in the first embodiment.
Figure 4B:
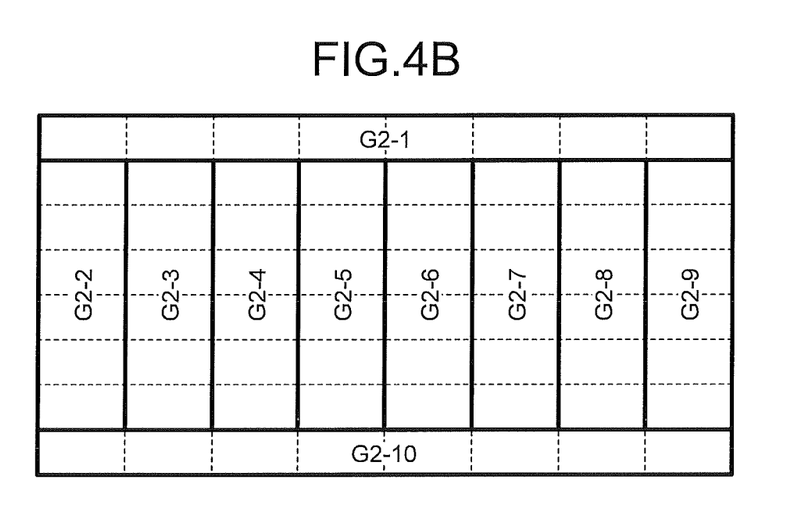
FIG. 4B is a diagram for explaining an example of type 2 groups.
Figure 5A:
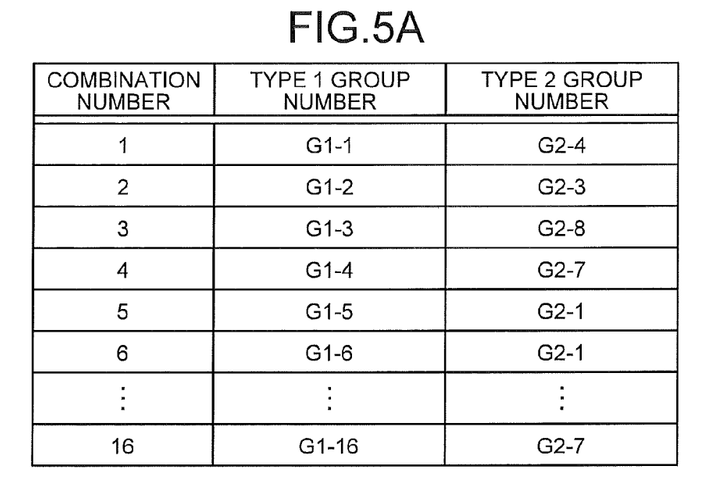
FIG. 5A is a diagram showing an example of a correspondence relation table in the first embodiment.
Figure 5B:
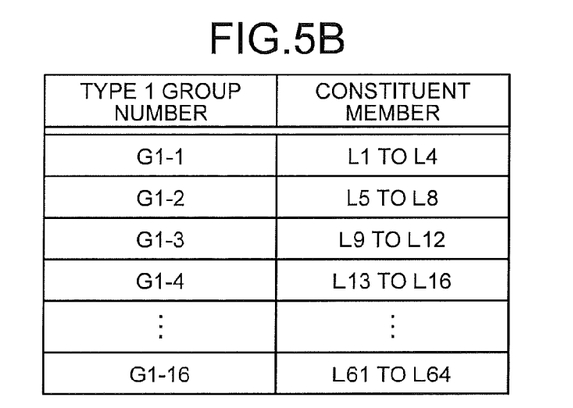
FIG. 5B is a diagram showing an example of a correspondence relation table.
Figure 5C:
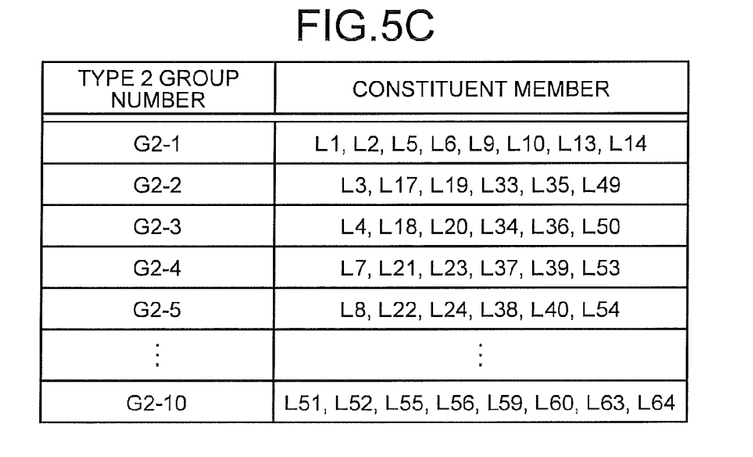
FIG. 5C is a diagram showing an example of a correspondence relation table.

FIGS. 3A and 3B are diagrams for explaining examples of the type 1 groups in the first embodiment. FIGS. 4A and 4B are diagrams for explaining examples of the type 2 groups in the first embodiment. FIGS. 5A to 5C are diagrams showing examples of the correspondence relation table in the first embodiment.

In FIG. 3A, an outer frame indicates an entire area that can be illuminated by the lighting control system 1. A rectangle of a minimum unit, i.e., a region divided by dotted lines indicates a lighting area of one luminaire 2. A number affixed in the region indicates an identification number of the luminaire 2. That is, in FIG. 3A, sixty-four luminaires 2 L1 to L64 are arranged in the entire area. Four luminaires 2 surrounded by a solid line form the type 1 group, respectively. A rectangle region surrounded by the solid line indicates a group area that can be illuminated by one type 1 group. In FIG. 3B, numbers affixed in group areas indicate identification information of the type 1 groups. That is, in FIG. 3B, sixteen type 1 groups G1-1 to G1-16 are arranged in the entire area.

In FIG. 4A, a plurality of luminaires 2 surrounded by solid lines respectively form the type 2 groups. In FIG. 4B, numbers affixed to the group areas indicate identification information of the type 2 groups. That is, as it is seen when FIGS. 3A and 3B and FIGS. 4A and 4B are compared, in the type 1 groups and the type 2 groups, allocation methods of grouping of luminaire groups are different. Both the type 1 group and the type 2 group are set for one luminaire.

Examples of the correspondence relation table obtained when the grouping shown in FIGS. 3A and 3B and FIGS. 4A and 4B is performed are shown in FIGS. 5A to 5C. In FIG. 5A, an inter-group correspondence table is shown. The inter-group correspondence table indicates a correspondence relation between the type 1 groups and the type 2 groups. In FIG. 5B, a type 1 group table is shown. The type 1 group table indicates constituent members (i.e., the luminaires 2) of the type 1 groups. In FIG. 5C, a type 2 group table is shown. The type group table indicates constituent members (i.e., the luminaires 2) of the type 2 groups. In the example explained above, the correspondence relation table is configured by three tables of the inter-group correspondence table, the type 1 group table, and the type 2 group table. However, the correspondence relation table is not limited to this. The three tables maybe combined into one to form the correspondence relation table.

Figure 6:
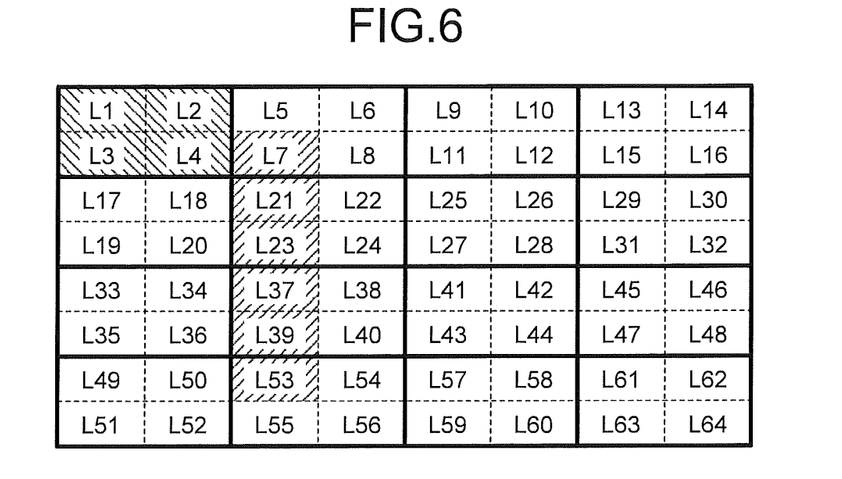
FIG. 6 is a diagram served for explanation of the processing operation of the control unit in the first embodiment.

Referring back to FIG. 2, the control unit 5 transmits a control signal corresponding to the specified control content to the constituent members of the specified the type 1 groups and the type 2 groups (ACT 2). Consequently, lighting states of the type 1 groups and the type 2 groups are controlled. For example, if the type 1 group G1-1 is a lighting target, since the type 2 group G2-4 is associated with the type 1 group G1-1 in the correspondence relation table in FIGS. 5A to 5C, the control unit 5 transmits a control signal for lighting the luminaires 2 at reception destinations to the constituent members of the type 1 group G1-1 and the type 2 group G2-4. Consequently, the constituent members of the type 1 group G1-1 and the type 2 group G2-4 change to a lighting state shown in FIG. 6.

As explained above, according to the first embodiment, in the lighting control system 1, the storing unit 3 stores the correspondence relation in which at least one of the plurality of type 2 groups is associated with each of the type 1 groups. In the type 1 groups and the type 2 groups, the methods of allocation of the K luminaires 2-1 to 2-K are different. The control unit 5 controls a lighting state of the type 1 groups indicated by an input control signal and controls a lighting state of the type 2 groups associated with the type 1 groups to be controlled in the correspondence relation.

Consequently, it is possible to control, in addition to the lighting state of the type 1 groups to be directly controlled, the lighting state of the type 2 groups associated with the type 1 groups. Therefore, it is possible to improve a sense of brightness. Further, a population of distribution sources is common in the type 1 groups and the type 2 groups. Therefore, it is possible to realize improvement of a sense of brightness with a small number of luminaires. That is, it is possible to improve a sense of brightness while reducing costs.

The associated control of the type 2 groups involved in the individual control of the type 1 groups and the individual control of the type 2 groups are explained. In the following explanation, it is assumed that the type 2 groups are associated with the type 1 groups.

If a type 2 group is subjected to the individual control to be lit, only the type 2 group is lit. Subsequently, if the type 1 group is subjected to the individual control to be lit in a state in which the type 2 group is lit, the type 2 group is subjected to the individual control and the associated control involved in the individual control of the type 1 group. However, since the associated control is preferentially performed, the lighting state is maintained.

Further, if the type 2 group is subjected to the individual control to be extinguished, since the associated control involved in the individual control of the type 1 group is preferentially performed, the lighting state of the type 2 group involved in the associated control is maintained. Further, if the type 1 group is subjected to the individual control to be extinguished, the type 2 group is extinguished by the associated control. If the type 1 group are subjected to the individual control to be lit, the lighting state of the type 2 group is maintained by the associated control irrespective of content of the individual control of the type 2 group.

On the other hand, when the individual control of the type 2 group and the associated control involved in the individual control of the type 1 group are performed and the type 2 group is maintained in the lighting state, if the individual control for maintaining the type 1 group in extinguishing states is performed, the associated control for extinguishing the type 2 group is performed. However, since the individual control for lighting the type 2 group is preferentially performed, the lighting state is maintained.

As explained above, if the control unit controls the type 2 group, the associated control for controlling the type 2 group to be lit has the highest priority, the individual control for lighting and extinguishing the type 2 group has the second highest priority, and the associated control for controlling the type 2 group to be extinguished has the lowest priority.

Consequently, if the individual control for controlling the type 1 group to be lit is performed, it is possible to light the type 2 group with the highest priority.

If a part of the constituent members of the type 1 group and a part of the constituent members of the type 2 group are redundantly set, concerning the redundant constituent members, the control unit performs control to more preferentially perform the individual control of the type 1 group than the associated control of the type 2 group involved in the individual control of the type 1 group. In other words, concerning the redundantly set constituent members of the type 1 and type 2 groups, the individual control of the type 1 group has the highest priority in addition to the priority explained above.

The priority explained above is reflected on control content as well. For example, if an optical output (e.g., a dimming level) by the individual control and an optical output (e.g., a dimming level) by the associated control are different, the optical outputs can be adjusted according to control content of the individual control or the associated control having higher priority.

In the explanation in this embodiment, the operation unit is used as an example. However, a control signal may be transmitted to the control unit on the basis of sensor detection information of, for example, a human sensor, an image sensor, or a temperature sensor.

The above explanation is based on the premise that the methods of allocation of grouping of the luminaire groups are different in the type 1 groups and the type 2 groups. However, a method of allocation of grouping is not limited to this. At least one of the type 1 groups and at least one of the type 2 groups may be associated with each of sixteen groups shown in FIGS. 3A and 3B and at least one group belonging to the type 2 groups may be associated with each of groups belonging to the type 1 groups. That is, at least one of the type 1 groups and at least one of the type 2 groups may be associated with each of a plurality of groups obtained by one allocation method and at least one group belonging to the type 2 groups may be associated with each of the groups belonging to the type 1 groups. Even in such an allocation method of grouping, it is possible to apply the processing by the lighting control system.

Second Embodiment

In an explanation in a second embodiment, positions where constituent members of the type 2 groups are arranged are areas extending along the wall. That is, the first embodiment and the second embodiment are different only in contents of the correspondence relation table.

Figure 7:
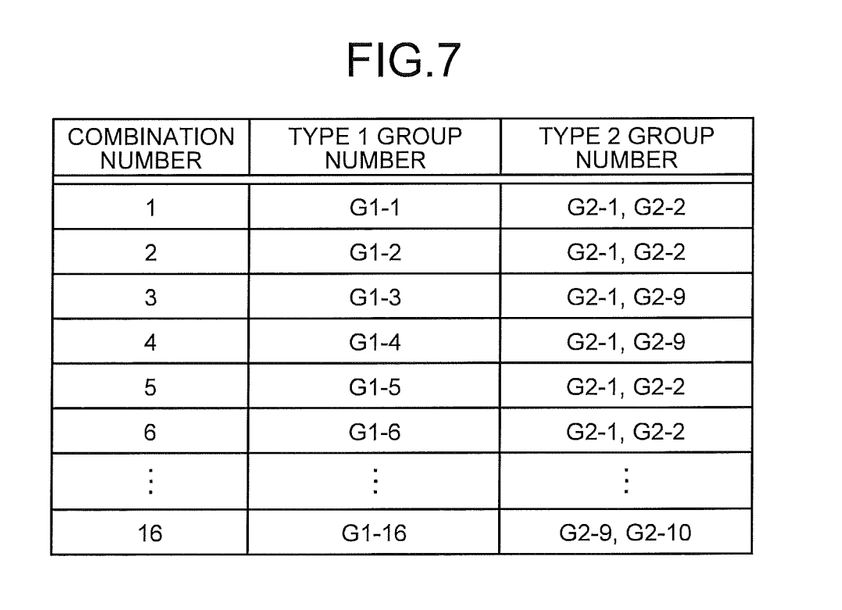
FIG. 7 is a diagram showing an example of a correspondence relation table in a second embodiment.
Figure 8:
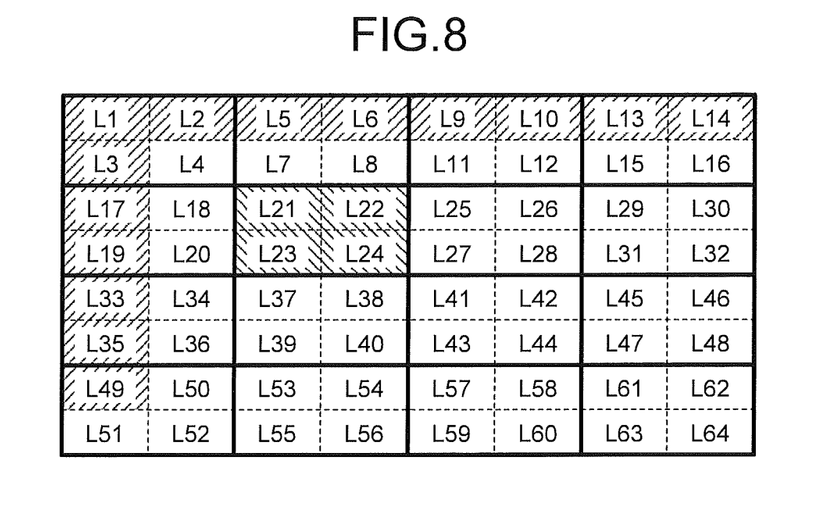
FIG. 8 is a diagram served for explanation of a processing operation of a control unit in the second embodiment.

FIG. 7 is a diagram showing an example of a correspondence relation table in the second embodiment. As shown in FIG. 7, in type 2 groups associated with type 1 groups, constituent members are luminaires arranged in a wall side region excluding a center region of a ceiling surface. In particular, in the example shown in FIG. 7, two type 2 groups are associated with each of the type 1 groups in order from a wall closest to a group area of each of the type 1 groups. For example, if a type 1 group G1-6 is a lighting target, since type 2 groups G2-1 and G2-2 are associated with the type 1 group G1-6 in the correspondence relation table in FIG. 7, the control unit 5 transmits a control signal for lighting the luminaires 2 at reception destinations to constituent members of the type 2 groups G2-1 and G2-2. Consequently, the constituent members of the type 2 groups G2-1 and G2-2 change to a lighting state shown in FIG. 8.

As explained above, according to the second embodiment, the type 2 groups are configured by the luminaires arranged in the wall side regions excluding the center regions of the ceiling surface.

Consequently, it is possible to increase an amount of light reflected by the wall and traveling to the center region side. A sense of brightness felt by a person is related to an amount of light entering the eyes from the front. If the amount of light reflected by the wall and traveling to the center region side is increased, the amount of light entering the eyes increases. Therefore, it is possible to efficiently improve the sense of brightness.

Third Embodiment

In a third embodiment, in a correspondence relation table, type 2 groups corresponding to directions of a person in group areas of type 1 groups are associated with the type 1 groups.

FIG. 9 is a block diagram showing an example of a lighting control system according to the third embodiment. In FIG. 9, a lighting control system 10 includes a detecting unit 11 and a control unit 12.

The detecting unit 11 detects presence and direction of a person in a setting area corresponding to each of the type 1 groups. A human sensor may be used as the detecting unit 11. The human sensor may be a human sensor that detects a person using an infrared ray, may be a human sensor that detects a person using ultrasound or visible light, or may be an arbitrary combination of the human sensors. As the detecting unit 11, a brightness sensor may be used. The detecting unit 11 may detect a person using an image picked up by an image pickup unit (not shown in the figure). An arrangement position of the detecting unit 11 is different depending on a type and sensitivity of a device used as the detecting unit 11. One detecting unit 11 may be arranged in the center of the ceiling surface as long as the detecting unit 11 can detect a desired area. One detecting unit 11 may be arranged in each of the setting areas of the type 1 groups.

The control unit 12 controls a lighting state of the type 2 groups specified on the basis of a control signal received from the operation unit 4, a direction of a person detected by the detecting unit 11 in a setting area corresponding to the type 1 group indicated by the control signal, and the correspondence relation table.

Specifically, the control unit 12 controls a lighting state of the type 2 group associated, in the correspondence relation table, with the type 1 group indicated by the control signal and direction of a person detected in the setting area corresponding to the type 1 group indicated by the control signal.

Figure 10:
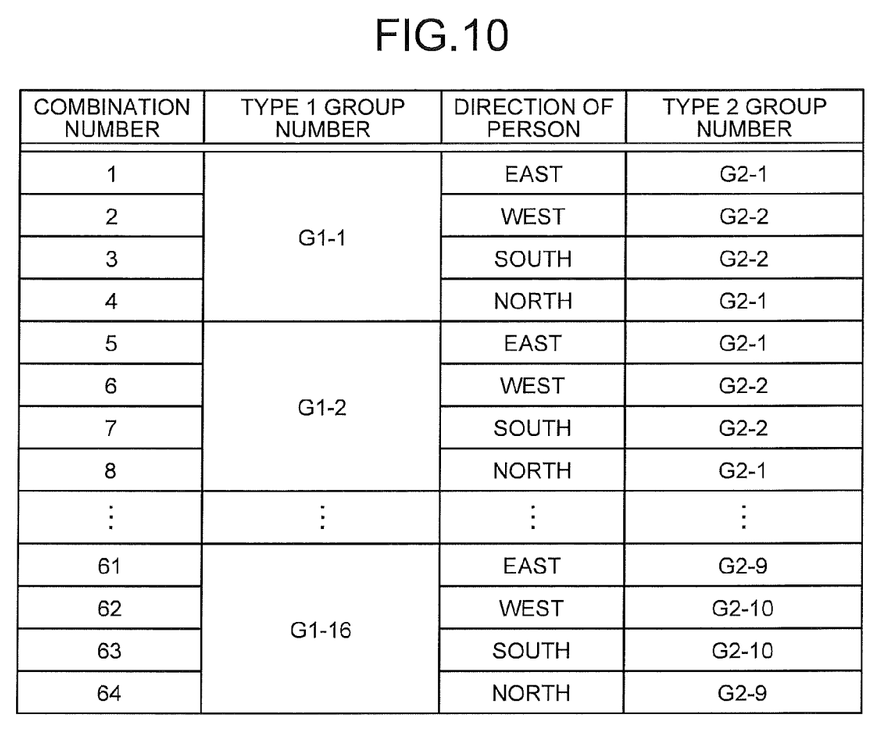
FIG. 10 is a diagram showing an example of a correspondence relation table in the third embodiment.

FIG. 10 is a diagram showing an example of the correspondence relation table in the third embodiment. As shown in FIG. 10, in the correspondence relation table, the type 2 groups corresponding to directions of a person are associated with each of the type 1 groups. North in FIG. 10 is a direction in which G1-1 to G1-4 in FIG. 3B are located viewed from the center of the room.

It is known that a sense of brightness felt by a person is related to an amount of light entering the eyes from the front of the person. Therefore, in the correspondence relation table shown in FIG. 10, the type 2 groups located in a direction as close as possible to a direction in which the person faces and along the wall are associated with the type 1 group corresponding to a group area where the person is detected. Therefore, the control unit 12 adjusts a lighting state of the type 2 groups using the correspondence relation table, whereby it is possible to improve the sense of brightness felt by the person.

Figure 11:
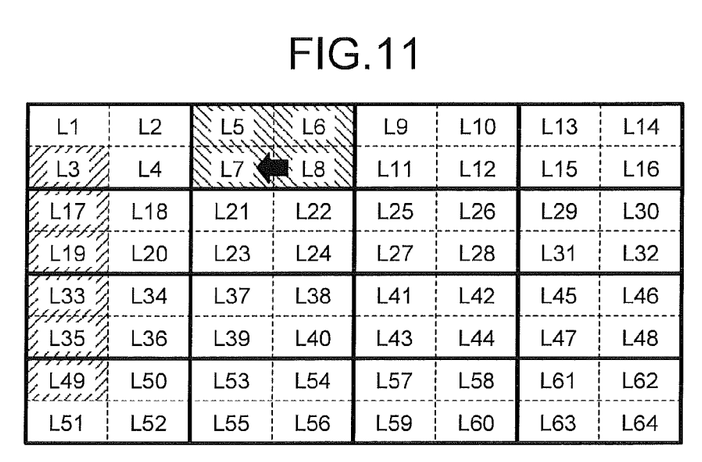
FIG. 11 is a diagram served for explanation of a processing operation of a control unit in the third embodiment.

For example, if the detecting unit 11 detects that a person is present in an area corresponding to the type 1 group G1-2 and faces the West direction, the type 2 group G2-2 is associated with the type 1 group G1-2 in the correspondence relation table in FIG. 10. Therefore, the control unit 12 transmits a control signal for lighting the luminaires 2 at reception destinations to constituent members of the type 2 group G2-2. Consequently, the constituent members of the type 2 group G2-2 change to a lighting state shown in FIG. 11. A start point of an arrow in FIG. 11 represents a detection position of the person and the direction of the arrow represents the direction of the person.

As explained above, according to the third embodiment, in the lighting control system 10, the detecting unit 11 detects the presence and a direction of a person in a setting area corresponding to each of the type 1 groups. In the correspondence relation table stored in the storing unit 3, a plurality of direction candidates and the type 2 groups corresponding to each of the direction candidates are associated with each of the type 1 groups. The control unit 12 controls a lighting state of the type 2 groups associated with the type 1 group indicated by the control signal and the direction of the person detected in the setting area corresponding to the type 1 group indicated by the control signal in the correspondence relation table.

Consequently, it is possible to surely increase light entering the eyes from the front of the person and efficiently improve the sense of brightness.

Fourth Embodiment

In a fourth embodiment, a detecting unit configured to detect the brightness of the wall in the room is provided. A lighting level of type 2 groups, constituent members of which are arranged in positions along the wall, is controlled according to a dimming control signal corresponding to the brightness detected by the detecting unit.

FIG. 12 is a block diagram showing an example of a lighting control system according to the fourth embodiment. In FIG. 12, a lighting control system 20 includes a detecting unit 21 and a control unit 22.

The detecting unit 21 is, for example, a brightness sensor. The detecting unit 21 detects the brightness of the wall in the room. An arrangement position of the detecting unit 21 is different depending on a type and sensitivity of a device used as the detecting unit 21. One detecting unit 21 may be arranged in the center of the ceiling surface as long as the detecting unit 21 can detect a desired area. One detecting unit 21 may be arranged in each of the setting areas of the type 1 groups along the wall.

The control unit 22 specifies the type 2 groups corresponding to a type 1 group indicated by a control signal using the correspondence relation table similar to the second embodiment. That is, in the specified type 2 group, positions where constituent members are arranged are areas extending along the wall. Therefore, the control unit 22 generates a dimming control signal corresponding to a level of brightness detected for the wall in the vicinity of group areas of the specified type 2 groups and outputs the dimming control signal to the luminaire 2 included in the specified type 2 groups. Consequently, it is possible to optimize the brightness of the wall, which affects a sense of brightness felt by a person, by adjusting the brightness of the luminaires on the basis of actually detected brightness. For example, the dimming control signal includes light emission level information. Upon receiving the dimming control signal, the luminaires 2 are lit at brightness corresponding to a light emission level indicated by the dimming control signal.

As explained above, according to the fourth embodiment, the detecting unit 21 detects the brightness of the wall in the room. The control unit 22 outputs the dimming control signal corresponding to the level of the detected brightness to the luminaires 2 included in the type 2 groups, the lighting state of which is to be controlled.

Consequently, it is possible to optimize the brightness of the wall, which affects a sense of brightness felt by a person, by adjusting the brightness of the luminaires on the basis of actually detected brightness.

Fifth Embodiment

A fifth embodiment relates to a processing operation of a control unit during lighting of a plurality of type 1 groups and type 2 groups associated with all the plurality of type 1 groups in a correspondence relation table.

In an example explained below, in particular, the processing operation of the control unit is applied to the lighting control system 1 according to the first embodiment.

In the lighting control system 1 according to the fifth embodiment, the control unit 5 performs adjustment explained below during lighting of a first type 1 group, a second type 1 group, and a type 2 group associated with both of the first type 1 group and the second type 1 group in the correspondence relation table (in the following explanation, sometimes referred to as first lighting timing). That is, the control unit 5 adjusts a dimming level of the luminaires 2, which are constituent elements of the first type 1 group and are constituent elements of the type 2 group, to a dimming level of the first type 1 group. In other words, the lit luminaires 2 belonging to both the type 1 group and the type 2 group are adjusted to the dimming level of the type 1 group more preferentially than the type 2 group. Whereas the type 1 groups play a central role for lighting target areas, the type 2 groups play an auxiliary role for lighting the target areas. Therefore, for example, the intensity of light of the type 1 group is adjusted to be higher than the intensity of light of the type 2 group.

If the control unit 5 receives a control signal for instructing extinguishing of the first type 1 group from the operation unit 4 at the first lighting timing, the control unit 5 extinguishes only the luminaires 2, which are the constituent elements of the first type 1 group and are not the constituent elements of the type 2 group. In this case, further, the control unit 5 adjusts the dimming level of the luminaires 2, which are the constituent elements of the first type 1 group and the constituent elements of the type 2 group, from the dimming level of the first type 1 group to a dimming level of the type 2 group.

Figure 13A:
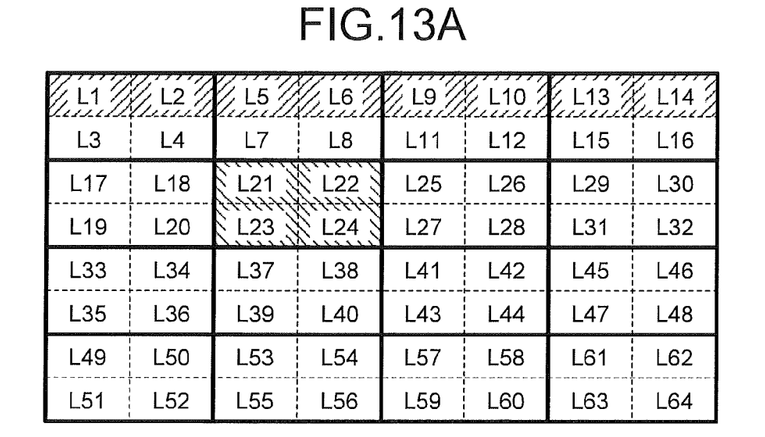
FIG. 13A is a diagram served for explanation of a processing operation of a control unit in a fifth embodiment.
Figure 13B:
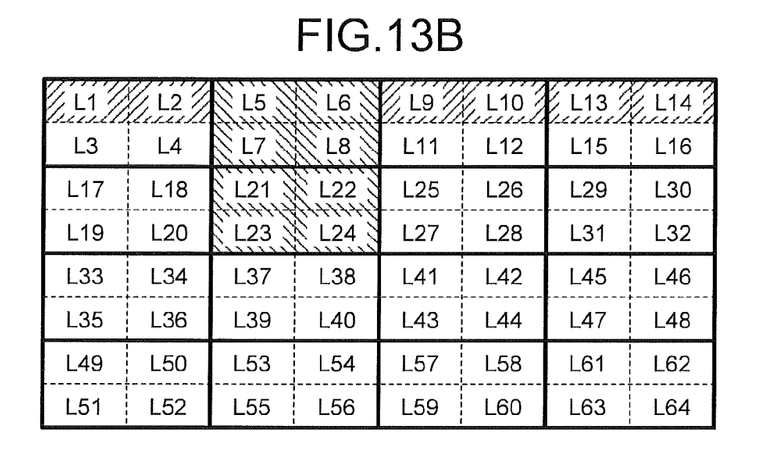
FIG. 13B is a diagram served for explanation of the processing operation of the control unit.
Figure 13C:
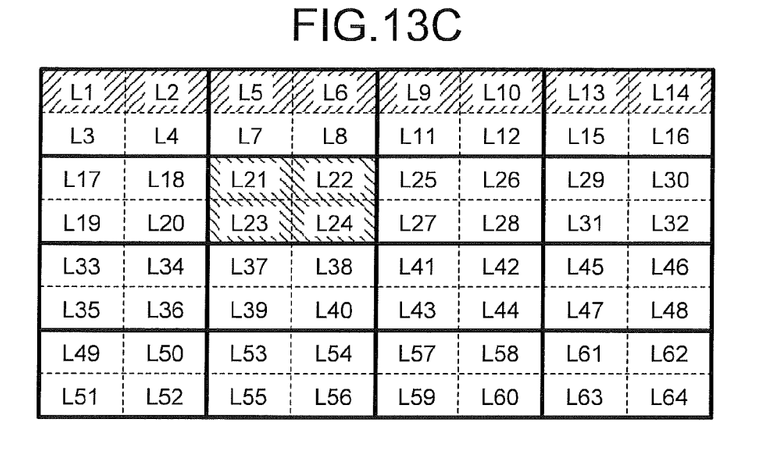
FIG. 13C is a diagram served for explanation of the processing operation of the control unit.

The processing operation of the control unit in the fifth embodiment is explained with reference to a specific example. In particular, the processing operation is explained on the basis of the correspondence relation in the second embodiment. FIGS. 13A to 13C are a diagram served for the explanation of the processing operation of the control unit in the fifth embodiment.

In FIG. 13A, the type 1 group G1-6 (luminaire identification numbers L21 to L24) and the type 2 group G2-1 (luminaire identification numbers L1, L2, L5, L6, L9, L10, L13, and L14) associated with the type 1 group G1-6 are lit. At this point, upon receiving a control signal for lighting the type 1 group G1-2 (luminaire identification numbers L5 to L8) from the operation unit 4, the control unit 5 specifies the type 2 group G2-1 associated with the type 1 group G1-2. The control unit 5 controls a lighting state of the type 1 group G1-2 and the type 2 group G2-1. Specifically, the control unit 5 lights the luminaires 2 L5 to L8, which are constituent members of the type 1 group G1-2, at the dimming level of the type 1 groups. More specifically, the control unit 5 lights the luminaires 2 L7 and L8, which are in an extinguishing state, at the dimming level of the type 1 groups and adjusts a dimming level of the luminaires 2 L5 and L6, which are already lit at the dimming level of the type 2 group, to the dimming level of the type 1 groups (see FIG. 13B). The luminaires 2 L1, L2, and L9 to L14, which do not overlap the constituent members of the type 2 group G2-1, among the constituent members of the type 2 group G2-1 are lit together with the type 1 group G1-6 during lighting of the type 1 group G1-6. Therefore, it is unnecessary to specifically adjust the luminaires 2.

In a state shown in FIG. 13B, upon receiving a control signal for extinguishing the type 1 group G1-2 from the operation unit 4, the control unit 5 extinguishes the luminaires 2 L7 and L8, which are constituent members of the type 1 group G1-2 and are not constituent members of the type 2 group G2-1. Further, the control unit 5 adjusts a dimming level of the luminaires 2 L5 and L6, which are constituent members of the type 1 group G1-2 and are constituent members of the type 2 group G2-1, from the dimming level of the type 1 groups to the dimming level of the type 2 group (see FIG. 13C).

As explained above, according to the fifth embodiment, in the lighting control system 1, the control unit 5 adjusts the dimming level of the luminaires 2, which are the constituent elements of the first type 1 group and are the constituent elements of the type 2 group, to the dimming level of the first type 1 group during the lighting of the first type 1 group, the second type 1 group, and the type 2 group associated with both of the first type 1 group and the second type 1 group in the correspondence relation table.

Consequently, it is possible to cause the luminaires 2, which are the constituent elements of the type 1 groups and are the constituent elements of the type 2 group, to function as the type 1 groups that play the central role rather than as the type 2 groups that play the auxiliary role for lighting the target areas. Therefore, it is possible to prevent a fall in a sense of brightness in the target areas.

The control unit 5 extinguishes only the luminaires 2, which are the constituent elements of the first type 1 group and are not the constituent elements of the type 2 group, when the control unit 5 receives the control signal for extinguishing the first type 1 group during the lighting of the first type 1 group, the second type 1 group, and the type 2 group associated with both of the first type 1 group and the second type 1 group in the correspondence relation table.

Consequently, since the luminaires 2 belonging to the type 2 group corresponding to the second type 1 group are not extinguished, it is possible to prevent a fall in a sense of brightness in target areas corresponding to the second type 1 group. Since the luminaires 2, which are the constituent elements of the first type 1 group and are not the constituent elements of the type 2 group, are extinguished, it is possible to prevent useless power consumption.

Further, the control unit 5 adjusts the dimming level of the luminaires 2, which are the constituent elements of the first type 1 group and are the constituent elements of the type 2 group, from the dimming level of the first type 1 group to the dimming level of the type 2 group when the control unit 5 receives the control signal for instructing extinguishing of the first type 1 group during the lighting of the first type 1 group, the second type 1 group, and the type 2 group associated with both of the first type 1 group and the second type 1 group in the correspondence relation table.

Consequently, it is possible to cause the luminaires 2, which are the constituent elements of the first type 1 group and are the constituent elements of the type 2 group, to function as the type 2 group. Therefore, if the intensity of light of the type 1 groups is higher than the intensity of light of the type 2 groups, it is possible to prevent useless power consumption.

As explained above, according to the first to fifth embodiment, it is possible to improve the sense of brightness while reducing costs.

Other Embodiments

[1] In the first to fifth embodiments, the control unit is explained as one function block. However, the control unit is not limited to this. The control unit may include a central control unit and K control terminals respectively corresponding to K luminaires 2-1 to 2-K.

Figure 14:
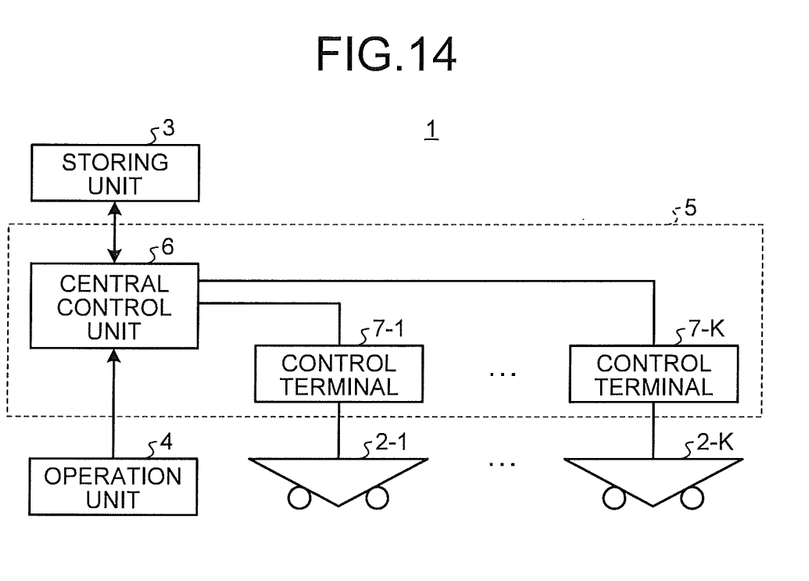
FIG. 14 is a block diagram showing an example of a lighting control system including a central control unit and a plurality of control terminals respectively corresponding to a plurality of luminaires.

FIG. 14 is a block diagram showing an example of a lighting control system including a plurality of control terminals respectively corresponding to a plurality of luminaires. In FIG. 14, the lighting control system 1 according to the first embodiment is shown.

In FIG. 14, the control unit 5 includes a central control unit 6 and control terminals 7-1 to 7-K.

Upon receiving a control signal from the operation unit 4, the central control unit 6 specifies type 1 group and type 2 group to be controlled and control content on the basis of the control signal and a correspondence relation table.

The central control unit 6 transmits a control signal to the control terminals 7 corresponding to the luminaires 2 included in the type 1 group and the type 2 group to be controlled.

When the control signal is transmitted to the control terminals 7, the control terminals 7 control a lighting state of the luminaires 2 subordinate to the control terminals 7 on the basis of the control signal.

In the above explanation, under the same idea as the first embodiment, the control signal is transmitted to the control terminals 7 corresponding to the luminaires 2 in a one-to-one relation. However, a processing operation is not limited to this. A processing operation explained below may be performed.

That is, the central control unit 6 transmits the control signal to the type 1 groups and the type 2 groups to be controlled.

The control terminals 7 store groups to which the luminaires 2 corresponding to the control terminals 7 belong. If the control signal is transmitted to the groups to which the luminaires 2 corresponding to the control terminals 7 belong, the control terminals 7 control a lighting state of the luminaires 2 subordinate to the control terminals 7 on the basis of the control signal.

[2] In the third embodiment, if the presence of a person is not detected in an area where the luminaires 2 are lit, a lighting state of the type 1 groups and the type 2 groups corresponding to the area may be automatically controlled. In this case, both of the type 1 groups and the type 2 groups may be extinguished, lighting levels of both of the type 1 groups and the type 2 groups may be reduced, or only the type 2 groups may be extinguished and a lighting level of the type 1 groups may be reduced.

[3] In the third embodiment, a direction of a person is detected and the type 2 groups are associated with the direction. However, wall surface brightness affected by the type 2 groups may be further detected and a lighting control state may be changed according to the detected brightness. In this case, it is possible to dynamically change allocation and control content of the type 2 groups while detecting a direction of a person and wall surface brightness corresponding to the direction of the person.

[4] In the explanation in the first to fifth embodiments, the luminaire groups are configured by the luminaires arranged on the ceiling. However, the luminaire groups are not limited to this. The luminaire groups may include luminaires arranged in a place other than the ceiling (e.g., a wall).

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A lighting control system comprising:
    a group of luminaires in which a plurality of type 1 groups and a plurality of type 2 groups allocated to respective setting areas are set;
    a control unit configured to subject each of the type 1 groups and the type 2 groups to individual control and subject, according to the individual control of a first type 1 group, a first type 2 group associated with the first type 1 group to associated control, and more preferentially perform the associated control for lighting the first type 2 group involved in the individual control of the first type 1 group than the individual control of the first type 2 group associated with the first type 1 group; and
    a detecting unit configured to detect brightness of a wall in a room,
    wherein
    the group of luminaires are arranged on a ceiling surface in the room,
    each of the type 2 groups is configured by luminaires arranged in a wall side region excluding a center region of the ceiling surface, and
    the control unit performs, according to a level of the detected brightness, the associated control of the first type 2 group involved in the individual control of the first type 1 group.

2. The system according to claim 1, wherein at least one of the plurality of the type 2 groups is associated with each of the type 1 groups.

3. A lighting control system comprising:
a group of luminaires in which a plurality of type 1 groups and a plurality of type 2 groups allocated to respective setting areas are set;
a control unit configured to subject each of the type 1 groups and the type 2 groups to individual control and subject, according to the individual control of a first type 1 group, a first type 2 group associated with the first type 1 group to associated control, and more preferentially perform the associated control for lighting the first type 2 group involved in the individual control of the first type 1 group than the individual control of the first type 2 group associated with the first type 1 group; and
a detecting unit configured to detect a direction of a person in a setting area corresponding to each of the type 1 groups, wherein
a plurality of direction candidates and the type 2 groups corresponding to each of the direction candidates are associated with each of the type 1 groups.

4. The system according to claim 3, wherein at least one of the plurality of the type 2 groups is associated with each of the type 1 groups.

5. A lighting control system comprising:
a group of luminaires in which a plurality of type 1 groups and a plurality of type 2 groups allocated to respective setting areas are set; and
a control unit configured to subject each of the type 1 groups and the type 2 groups to individual control and subject, according to the individual control of a first type 1 group, a first type 2 group associated with the first type 1 group to associated control, and more preferentially perform the associated control for lighting the first type 2 group involved in the individual control of the first type 1 group than the individual control of the first type 2 group associated with the first type 1 group, wherein,
when controlling luminaires, which are constituent elements of the first type 1 group and are constituent elements of the first type 2 group, the control unit more preferentially performs the individual control of the first type 1 group than the associated control of the first type 2 group involved in the individual control of the first type 1 group.

6. The system according to claim 5, wherein at least one of the plurality of the type 2 groups is associated with each of the type 1 groups.

7. A lighting control system comprising:
a group of luminaires in which a plurality of type 1 groups and a plurality of type 2 groups allocated to respective setting areas are set; and
a control unit configured to subject each of the type 1 groups and the type 2 groups to individual control and subject, according to the individual control of a first type 1 group, a first type 2 group associated with the first type 1 group to associated control, and more preferentially perform the associated control for lighting the first type 2 group involved in the individual control of the first type 1 group than the individual control of the first type 2 group associated with the first type 1 group, wherein
the control unit adjusts a dimming level of luminaires, which are constituent elements of the first type 1 group and are constituent elements of the first type 2 group, to a dimming level of the first type 1 group during lighting of the first type 1 group, a second type 1 group, and the first type 2 group associated with both of the first type 1 group and the second type 1 group in the correspondence relation.

8. The system according to claim 7, wherein, when the control unit receives a control signal for extinguishing of the first type 1 group, the control unit extinguishes only the luminaires, which are the constituent elements of the first type 1 group and are not the constituent elements of the first type 2 group.

9. The system according to claim 8, wherein the control unit adjusts a dimming level of the luminaires, which are the constituent elements of the first type 1 group and are the constituent elements of the first type 2 group, from a dimming level of the first type 1 group to a dimming level of the first type 2 group.

10. The system according to claim 7, wherein at least one of the plurality of the type 2 groups is associated with each of the type 1 groups.

\* \* \* \* \*